US005440879A

United States Patent [19]
Dellora

[11] Patent Number: 5,440,879
[45] Date of Patent: Aug. 15, 1995

[54] ELECTRONIC CONTROL SYSTEM FOR THE SPEED OF ROTATION OF A VARIABLE GEOMETRY TURBOCOMPRESSOR

[75] Inventor: Giancarlo Dellora, Settimo Torinese, Italy

[73] Assignee: Iveco Fiat S.p.A., Turin, Italy

[21] Appl. No.: 158,906

[22] Filed: Nov. 29, 1993

[30] Foreign Application Priority Data

Nov. 27, 1992 [IT] Italy ............................ TO92A0964

[51] Int. Cl.⁶ ............................................ F02B 37/12
[52] U.S. Cl. .................................. 60/602; 364/431.07
[58] Field of Search ............................ 60/600, 602; 364/431.07

[56] References Cited

U.S. PATENT DOCUMENTS

| | | |
|---|---|---|
| 4,571,945 | 2/1986 | Inada et al. .......................... 60/602 |
| 4,660,382 | 4/1987 | Ueno . | |
| 5,123,246 | 6/1992 | Younessi et al. ..................... 60/602 |
| 5,228,292 | 7/1993 | Hanauer et al. ..................... 60/602 |

FOREIGN PATENT DOCUMENTS 3233758 3/1984 Germany .

Primary Examiner—Richard A. Bertsch
Assistant Examiner—Charles G. Freay
Attorney, Agent, or Firm—Ladas & Parry

[57] ABSTRACT

An electronic control system for a variable geometry turbocompressor applied to a diesel engine, in which a first circuit produces, in response to input signals, a first closed-loop piloting signal supplied to an actuator which modifies the geometrical characteristics of the turbocompressor. The system further comprises a second circuit which receives as input a measurement signal proportional to the speed of rotation of the turbocompressor and generates a second piloting signal which is supplied to the actuator when the measurement signal exceeds a stored limit value.

11 Claims, 2 Drawing Sheets

ELECTRONIC CONTROL SYSTEM FOR THE SPEED OF ROTATION OF A VARIABLE GEOMETRY TURBOCOMPRESSOR

BACKGROUND OF THE INVENTION

The present invention relates to an electronic control system for the speed of rotation of a variable geometry turbocompressor (VGT) applied to an engine, in particular a diesel engine.

Closed-loop electronic control systems which generate a piloting signal (S) supplied to an actuator which modifies the geometrical characteristics of a variable geometry turbocompressor in response to a plurality of input signals measured in the engine are known.

In closed-loop control systems of known type, rapid variations of the input signals, due to engine operating transients (for instance rapid accelerations) are not correctly "monitored" by the electronic system which generates, during these transients, a piloting signal (S) which causes an increase in the speed of rotation of the turbocompressor which may easily revolve excessively.

SUMMARY OF THE INVENTION

The object of the present invention is to provide a control system for a variable geometry turbocompressor which remedies the drawbacks of known systems.

This object is achieved by the present invention which relates to an electronic control system for a variable geometry turbocompressor applied to an engine, in particular a diesel engine, comprising first electronic calculation means receiving as input a plurality of information signals (N, FR) measured in the engine, these first electronic calculation means generating as output, in response to the information signals, a first piloting signal (S), characterized in that it comprises second electronic calculation means having an input connected to sensor means coupled to the turbocompressor and generating a measurement signal (nT) proportional to the number of revolutions of the turbocompressor, these second electronic calculation means generating as output, in response to the measurement signal (nT), a second piloting signal (SnT) and electronic diverter means having an output adapted to supply a piloting signal to an actuator of the turbocompressor and at least a first and a second input connected respectively to the outputs of the first and second electronic calculation means, this system further comprising actuator means for the electronic diverter means adapted to connect this output with the second input when the instantaneous value of the measurement signal (nT) exceeds a stored threshold value (nTmax).

BRIEF DESCRIPTION OF THE DRAWINGS

The invention is described in detail with reference to the accompanying drawings, in which.

DETAILED DESCRIPTION OF THE INVENTION

Figure 1:
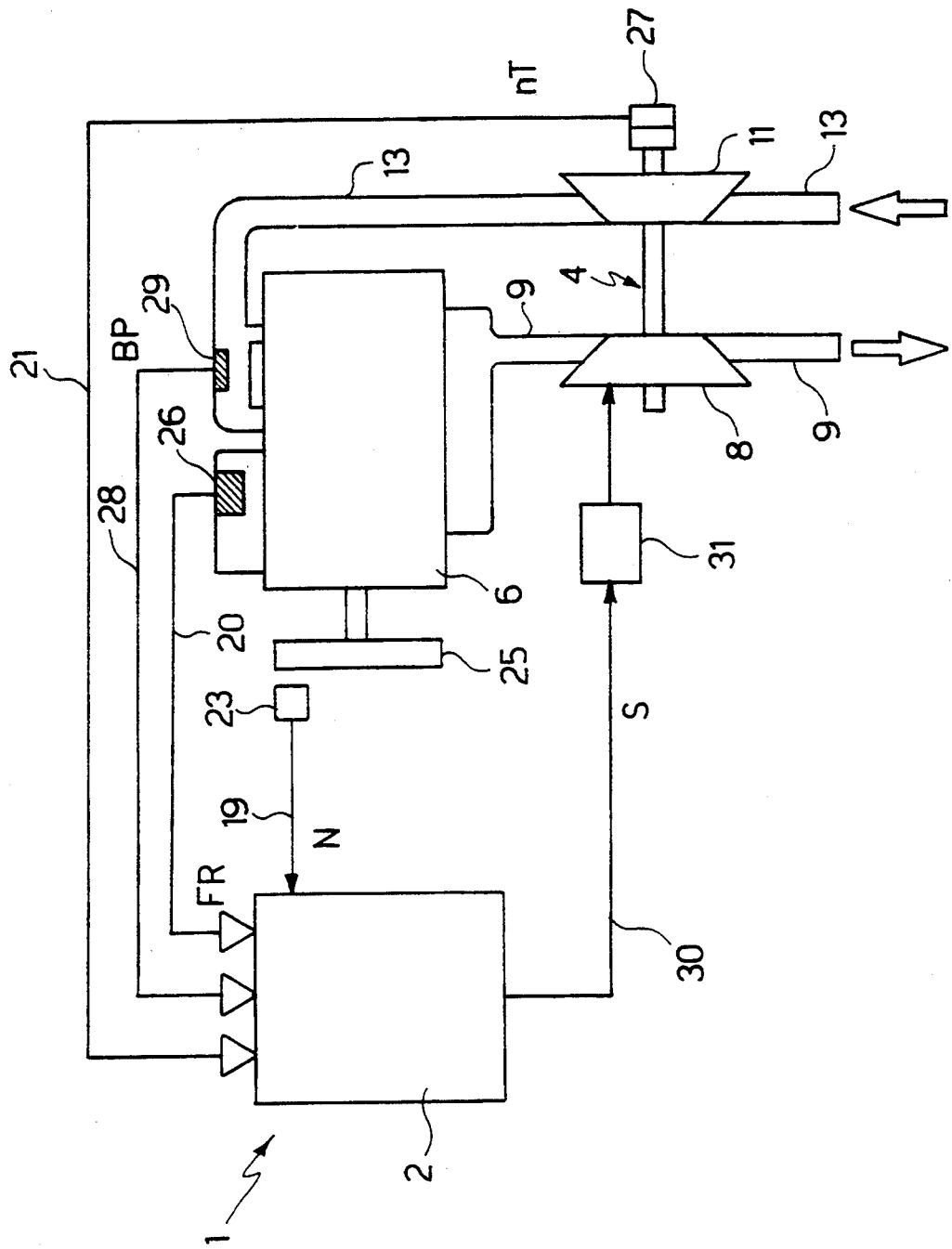
FIG. 1 is a diagrammatic illustration of a diesel engine coupled to a variable geometry turbocompressor controlled by an electronic unit operating in accordance with the system of the present invention.

In FIG. 1 an electronic control system is shown overall by 1 and operates in an central electronic unit 2 which controls a variable geometry turbocompressor 4 applied to a diesel engine 6 (shown diagrammatically). In particular, the turbocompressor 4 comprises a turbine 8 disposed along an exhaust duct 9 of the engine 6 supplied by the exhaust gases and a compressor 11 actuated by the turbine 8 and disposed along a suction duct 13 of the engine 6.

The input of the electronic unit 2 is connected via respective lines 19, 20 and 21 to a sensor 23 of the number of engine revolutions (N) disposed opposite the flywheel 25 of the engine 6, to a sensor 26 of the amount of fuel (FR) supplied to the engine 6 and to a sensor 27 of the number of revolutions (nT) of the turbocompressor 4. The input of the electronic unit 2 is further connected via a line 28 to a pressure sensor 29 which is disposed in the suction duct 13 downstream of the compressor 11 and which supplies a feedback signal to the unit 2.

The output of the electronic unit 2 is connected via a line 30 with an actuator 31 (for instance a servomotor) which modifies the geometrical characteristics of the turbine 8 in accordance with a piloting signal S supplied by the electronic unit 2.

The actuator 31 regulates the opening of a nozzle (not shown) via which the exhaust gases flow before striking the rotor (not shown) of the turbine 8; in particular, a decrease in the piloting signal S leads to a reduction of the cross-section of the nozzle and an increase in the speed of the gases striking the turbine such that the speed of rotation of the turbocompressor 4 increases.

Figure 2:
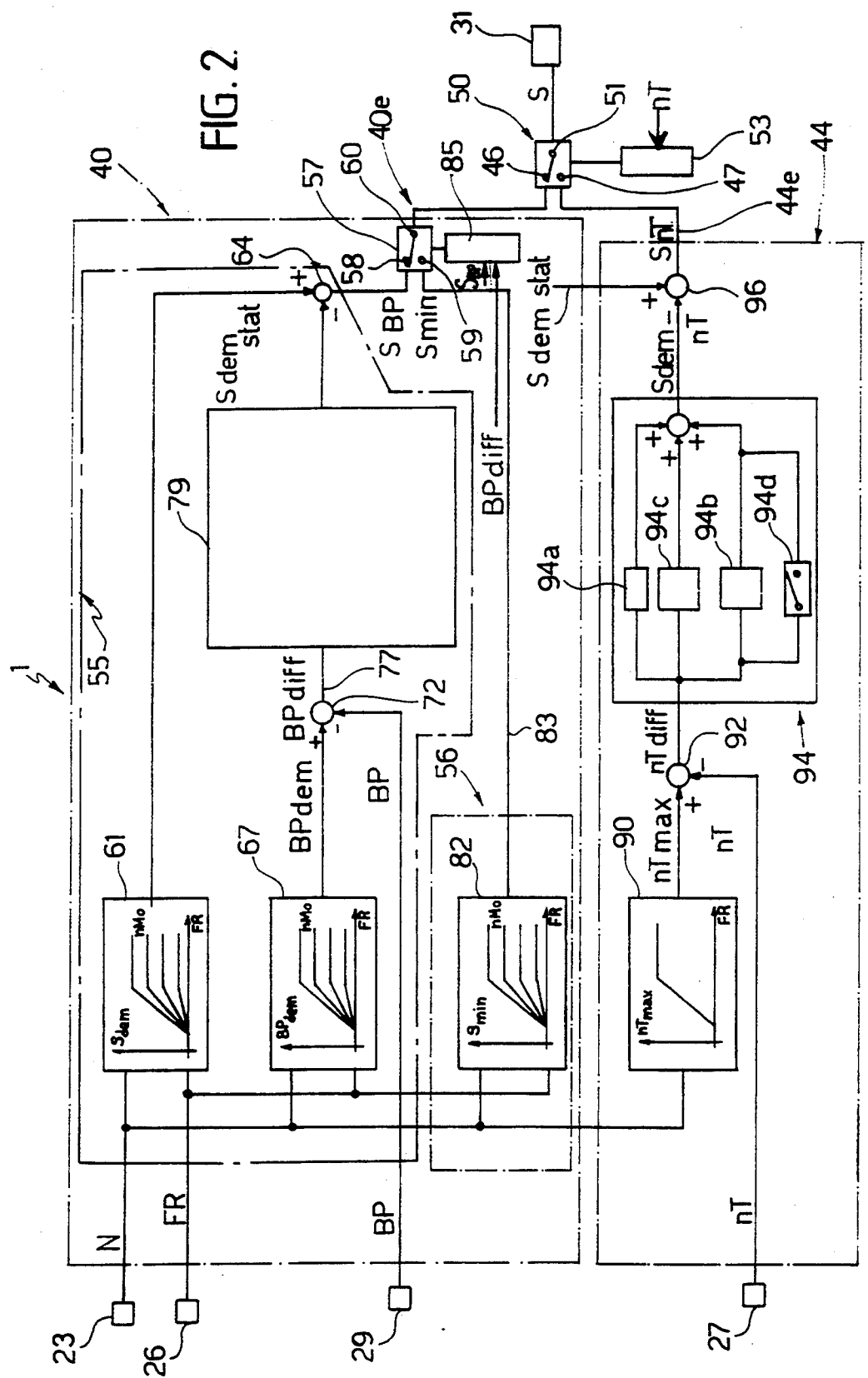
FIG. 2 is a block circuit diagram of the electronic unit operating in accordance with the system of the present invention.

FIG. 2 shows the circuit arrangement of the various members forming the electronic unit 2. In particular, the system 1 comprises a first calculation circuit 40 whose input is connected to the sensors 23 and 26 and which receives the feedback signal generated by the sensor 29 and a second calculation circuit 44 whose input is connected to the sensor 27. The first and the second calculation circuit 40, 44 have outputs 40e and 44e which are connected to respective first and second inputs 46, 47 of an electronic diverter 50 having an output 51 which supplies the actuator 31.

The electronic diverter 50 is further actuated by an electronic actuator 53 which receives as an input the signal generated by the sensor 27 and sets the diverter 50 on the basis of the result of the comparison between the value of this signal and a reference value. In particular, if the signal (nT) generated by the sensor 27 is less than a reference limit value (nTmax) the diverter 50 is disposed in a first position with the output 51 connected to the input 46, whereas if the signal (nT) generated by the sensor 27 is greater than a reference limit value (nTmax) the diverter 50 is disposed in a second position with the output 51 connected to the input 47.

The first calculation circuit 40 is substantially of the type described in the Italian Patent Application entitled "Electronic control system for a variable geometry turbocompressor" filed on the same date by the applicants, the relevant content of which is repeated below.

In particular, the circuit 40 comprises a first closed-loop calculation device 55 receiving as input the measurement signals N, FR and the feedback signal BP and generating as output a first closed-loop piloting signal SBP, and a second open-loop calculation device 56 receiving as input the measurement signals N, FR and generating as output a second open-loop piloting signal Smin.

The circuit 40 further comprises a diverter device 57 provided with a first and a second input 58, 59 connected respectively to the output of the devices 55 and 56 and having an output 60 communicating with the output 40e of the circuit 40.

In particular, the calculation device 55 comprises a first calculation unit 61 whose input is connected to the sensors 23 and 26 and which has an output connected to a summing input (+) of a node 64. The calculation unit 61 comprises an electronic map which associates, for each pair of values of the input signals N and FR generated by the sensors 23 and 26, a single value of an output signal Sdem, stat which represents the estimated value of the piloting signal of the actuator 31 under conditions of stationary or non-transient operation of the engine 6.

The device 55 further comprises a second calculation unit 67 whose input is connected to the sensors 23 and 26 and which has an output connected to a summing input (+) of a node 72 having a subtracting input (−) connected to the sensor 29.

The second calculation unit 67 comprises an electronic map which associates, for each pair of values of the input signals N and FR, a single value of an output signal BPdem which represents the estimated value of the supercharging pressure in the suction duct 13.

The node 72 has an output 77 which is connected to an input of a third calculation unit 79 having an output connected to a subtracting input (−) of the node 64 which further comprises an output connected to the input 58 of the diverter 57. The third calculating unit 79 can be a conventional PID calculator whose output is a compensated value of BPdiff.

The device 56 comprises a fourth calculation unit 82 whose input is connected to the sensors 23 and 26 and which has an output connected, via a line 83, to the input 59 of the diverter 57.

The calculation unit 82 comprises an electronic map which associates, for each pair of values of the input signals N and FR, an output signal Smin, which represents, for a specific operating speed of the engine defined by the signals N and FR, the limit value of the piloting signal (S) which may be supplied to the actuator 31 without excessively stressing the turbocompressor 4.

The system 1 further comprises a first actuator device 85 which actuates the diverter 57 and receives as input a first piloting signal constituted by the output signal SBP from node 64, and a signal BPdiff (which is the difference between the signal BPdem generated by the unit 67 and the signal BP generated by the sensor 29) measured at the input of the calculation unit 79.

In particular, the actuator device 85 actuates the diverter 57 such that its output 60 is connected respectively to the input 58 or the input 59 depending on whether the first piloting signal SBP is larger or smaller than a stored limit value Slim. Moreover, the selector device 85 actuates the diverter device 57 so as to connect its output 60 with the input 58 or with the input 59 depending on whether the signal BPdiff at the input of the unit 79 is greater or smaller than a stored limit value BPdiff,max.

The second calculation circuit 44 comprises a fifth electronic unit 90 whose input is connected to the sensor 23 and whose output is connected to a summing input of a node 92 having a subtracting input connected to the sensor 27. The electronic unit 90 comprises an electronic map which associates, for each value of the input signal generated by the sensor 23, a single value of an output signal nTmax which represents the limit speed of rotation of the turbocompressor 4. The node 92, moreover, has an output which is connected to the input of an electronic processing circuit 94 having an output connected to the subtracting input of a node 96 which further has a summing input receiving a signal from the output of the first calculation unit 61. The node 96 further comprises an output which supplies a piloting signal SnT to the output 44e of the calculation circuit 44.

The processing circuit 94 comprises a shunter-multiplier circuit 94a, an integrator-multiplier circuit 94b and a simple multiplier circuit 94c disposed in parallel with one another and having respective inputs and outputs connected to the input and output of the processing circuit 94. The processing circuit 94 further comprises an electronic switch 94d disposed in parallel with the integrator-multiplier circuit 94b and adapted to be closed or opened when the output 51 of the deflector 46 is connected to the input 46 or to the input 47 respectively.

In operation, under normal operating conditions, the speed of rotation (nT) of the turbocompressor 4 is smaller than a stored limit value (nTmax) and the diverter 46 is disposed in the abovementioned first position.

In these operating conditions, the first calculation circuit 40 supplies the actuator 31, while the second calculation circuit 44 is deactivated.

During stationary operation of the engine 4, the first piloting signal SBP is greater than the stored limit value Slim and the value of the signal BPdiff at the input of the unit 79 is smaller than the stored limit value dBPmax.

Under these conditions, therefore, the diverter 57 connects the first input 58 with the output 60 and the actuator 31 is piloted, in a substantially known manner, by the first closed-loop calculation device 55.

During an engine operating transient, due for instance to a rapid acceleration, the input signals FR and N supplied to the circuit 40 vary over a very short period, and the circuit 40 responds to this variation of the input signals by modifying the value of the control signal SBP in order to meet a greater power demand. For physical and mathematical reasons which are not dealt with in detail, the development of the control signal SBP would be such as to cause the turbocompressor 4 very quickly to revolve excessively. Since the speed of the gases supplied to the rotor 8b of the turbocompressor 4, and therefore the speed of rotation of the turbine 8, is inversely proportional to the value of the signal SBP, the increase in the speed of rotation is caused by the decrease of the signal SBP. The decrease of the signal SBP is therefore blocked by the selector device 85 which switches the diverter device 57 when the signal SBP drops below the threshold value Slim and therefore when the speed of the turbocompressor exceeds a maximum threshold value.

After the diverter device 57 has been switched, the actuator 31 is controlled by the second open-loop calculation device 56 which supplies, on the basis of the input signals N and BP, a value of the piloting signal which is always greater than the limit value, preventing the turbocompressor from revolving excessively.

The selector device 57 is also switched when the signal BPdiff at the input of the unit 79 exceeds the value BPdiff,max. This can be explained by the fact that the signal BPdiff represents the error of the estimated pressure value BPdem with respect to the pressure BP actually present in a suction duct 13 and the increase of this value BPdiff shows that the closed-loop calculation device 55 is no longer able to monitor the development of the parameters of the engine 6 and that the response signal SBP is inadequate.

If, despite the disactivation of the calculation device 55 and the actuation of the calculation device 56, the speed of rotation of the turbocompressor 4 continues to increase and exceeds the limit value nTmax, the diverter 50 is switched and the output 51 is connected to the input 47, thereby disactivating the first calculation circuit 40.

In these operating conditions, the signal generated by the sensor 27 is subtracted in the node 92 from the signal generated by the unit 90; the output signal nTdiff from the node 92 therefore represents the error nTdiff=nTmax-nT of the actual signal nT with respect to the estimated signal nTmax. This error signal nTdiff is processed by the circuit 94 which generates an output a signal Sdem,nT correcting the signal generated by the calculation unit 61. In particular, as the speed of rotation of the turbine 8 increases the error signal nTdiff increases and as a result the signal Sdem,nT which is generated by the processing circuit 94 also increases; the signal output by the node 96 will therefore increase since the signal Sdem,nT generated by the processing circuit 94 is added to the signal Sdem,stat. Consequently the calculation circuit 44 responds to an increase in the speed of rotation of the turbocompressor by increasing the piloting signal supplied to the actuator 31 which opens the nozzle (not shown), thereby decreasing the speed of rotation of the turbocompressor 4.

It is evident from the above that the system of the present invention resolves the drawbacks of the known systems.

The system 1, in addition to the indirect control of the speed of rotation of the turbocompressor 4 carried out by the circuit 55, makes it possible directly to control this speed by means of the circuit 44 which comes into operation as soon as the threshold value nTmax has been exceeded.

The speed control is also extremely rapid since the diverter acts instantaneously as soon as the threshold value is exceeded and the piloting signal supplied to the actuator 31 rapidly modifies the geometrical characteristics of the turbocompressor by returning the speed of rotation to correct values.

It is evident that modifications and variants may be made to the system described above without thereby departing from the protective scope of the invention.

What is claimed is:

1. An electronic control system for a variable geometry turbocompressor (4) applied to an engine (6), comprising first electronic calculation means (40) receiving as an input a plurality of information signals (N, FR) measured in the engine (6), said first electronic calculation means (40) generating as an output (40e), in response to the information signals (N, FR), a first piloting signal (S), second electronic calculation means (44) having an input connected to sensor means (27) coupled to the turbocompressor (4), said sensor means (27) generating a measurement signal (nT) proportional to the number of revolutions of the turbocompressor (4), said second electronic calculation means (44) generating as an input (44e), in response to the measurement signal (nT), a second piloting signal (SnT), and an electronic diverter means (50) having an output (51) adapted to supply a piloting signal to an actuator (31) of the turbocompressor (4) and at least a first (46) and a second (47) input connected respectively to the outputs of the first (40) and the second (44) electronic calculation means, the system (1) further comprising actuator means (53) for the electronic diverter means (50) adapted to connect the output (51) of the diverter means to the second input (47) of the diverter means when an instantaneous value of the measurement signal (nT) exceeds a stored threshold value (nTmax).

2. A system as claimed in claim 1, wherein the second calculation means (44) comprises an electronic calculation unit (90) receiving as an input at least one of the information signals (N) and having an output connected to a first input of a summing node (92), said electronic calculation unit (90) generating as an output, for each value of the input signal (N), a signal (nTmax) estimating a limit value of the speed of rotation of the turbocompressor (4), the summing node (92) further comprising a second input connected to the sensor means (27) and receiving the measurement signal (nT), said summing node (92) having as an output an error signal (nTdiff) formed by the difference between the estimate signal (nTmax) and the measurement signal (NT).

3. A system as claimed in claim 2, wherein the second calculation means (44) comprises a processing unit (94) whose input is connected to the output of the summing node (92) and which has an output communicating with the second input (47) of the electronic diverter means (50).

4. A system as claimed in claim 3, wherein in that the processing unit (94) comprises integrator-multiplier means (94b), shunter-multiplier means (94a) and multiplier means (94c) disposed in parallel with one another and interposed between the input and the output of the processing unit (94).

5. A system as claimed in claim 4, further comprising switch means (94d) disposed in parallel with the integrator-multiplier means (94b) and adapted to be actuated synchronously with the electronic diverter means (50).

6. A system as claimed in claim 3, further comprising a second node (96) having a first input connected to the output of the processing unit (94) and a second input supplied with a signal from the first electronic calculation means (40), the second node (96) having an output communicating with the second input (47) of the electronic diverter means (50).

7. A system as claimed in claim 1, wherein said information signals comprise a first signal (N) proportional to the number of revolutions of the engine (6) and a second signal (FR) proportional to the quantity of fuel supplied to the engine (6).

8. A system as claimed in claim 1, wherein said first electronic means (40) further receive a feedback signal proportional to the supercharging pressure (BP) measured in a supply duct (13) of the engine (6).

9. A system as claimed in claim 1, wherein said first electronic means (40) comprises closed-loop calculation means (55) receiving said information signals (N, FR) and a feedback signal (BP), said closed-loop calculation means (55) generating a first output piloting signal (SBP) in response to the information signals (Nmot, FR) and the feedback signal (BP), open-loop calculation means (56) receiving said information signals (N, FR) and generating a second output piloting signal (Smin), and a further electronic diverter means (57) having first and second inputs (58, 59) connected respectively to the output of the closed-loop calculation means (55) and the output of the open-loop calculation means (56), the further diverter means (57) having an output (60) which may be selectively connected to the first (58) or second (59) inputs of the electronic diverter means (50) on the basis of the result of the comparison of the value of the first output piloting signal (SBP) with a reference limit value (Slim).

10. A system as claimed in claim 6, wherein said first electronic calculation means comprises a first calculation unit having an input receiving said information signals (N, FR) and comprising an electronic map which associates said information signals and produces an output signal (Sdem, Stat) which represents said signal which is fed to said second node and is based on a condition of stationary operation of said engine.

11. An electronic control circuit for an actuator of a variable geometry turbocompressor comprising a first calculation means which is responsive to engine information signals and a second calculation means responsive to the number of rotations of the turbocompressor, said first and second calculation means having respective signal outputs which are fed to a diverter which directs one of the signals to the variable geometry turbocompressor, and an actuator for the diverter which determines which of the signals input to the diverter is connected to the diverter output based upon a comparison between the signal representing the number of revolutions of the turbocompressor and a stored threshold value for the number of revolutions of the turbocompressor.

* * * * *